Feb. 14, 1961    W. GRABER    2,971,612
LIQUID COOLED DISC BRAKE WITH AUTOMATIC BOOSTER
Filed Aug. 4, 1958    6 Sheets-Sheet 1

INVENTOR
WALTER GRABER
BY
ATTORNEYS

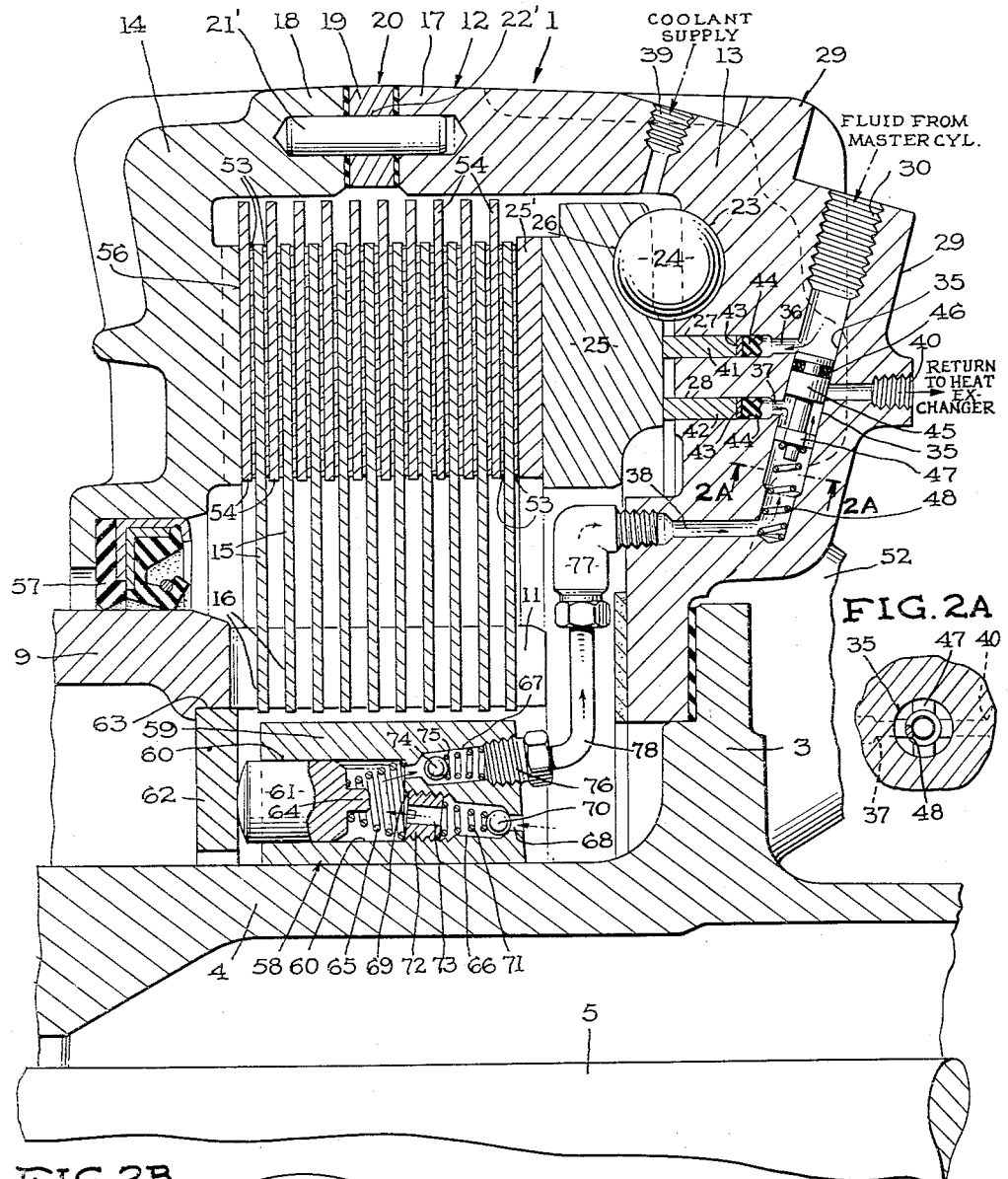
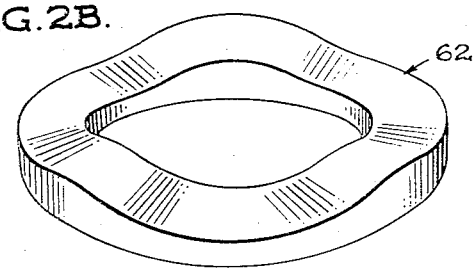

Feb. 14, 1961 W. GRABER 2,971,612
LIQUID COOLED DISC BRAKE WITH AUTOMATIC BOOSTER
Filed Aug. 4, 1958 6 Sheets-Sheet 3
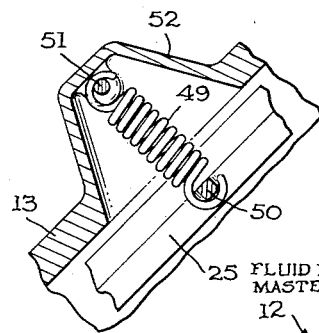
FIG. 3B.
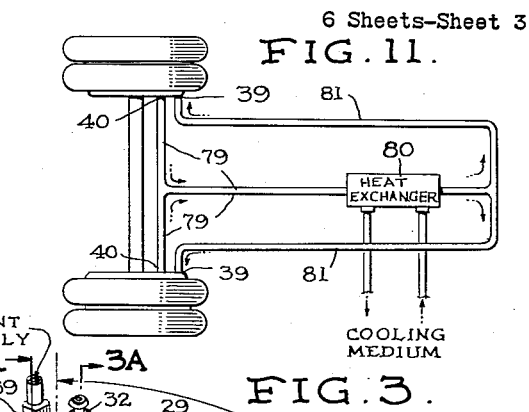
FIG. 11.
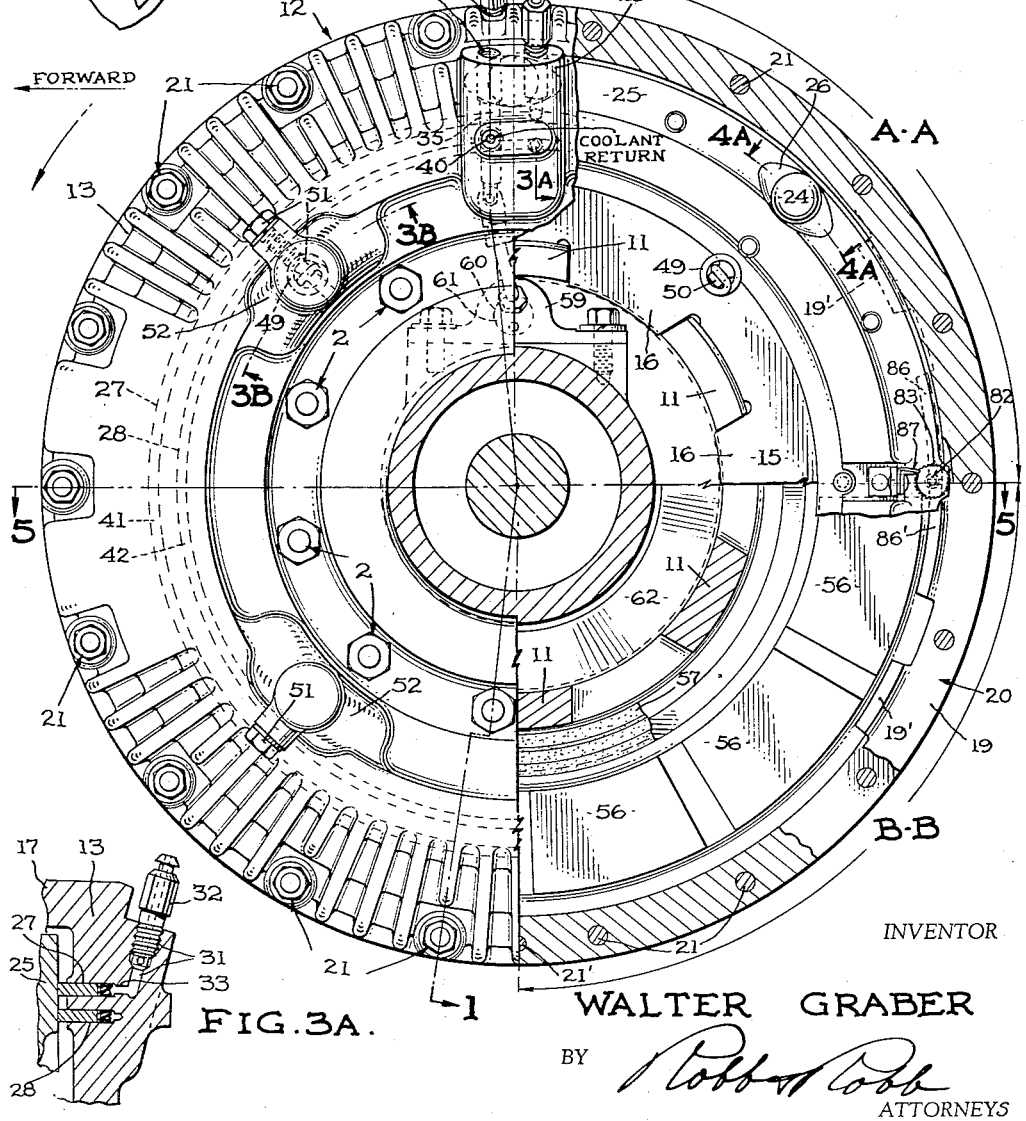
FIG. 3.
FIG. 3A.
INVENTOR
WALTER GRABER
BY
ATTORNEYS Feb. 14, 1961 W. GRABER 2,971,612
LIQUID COOLED DISC BRAKE WITH AUTOMATIC BOOSTER
Filed Aug. 4, 1958 6 Sheets-Sheet 5

INVENTOR
WALTER GRABER
BY
ATTORNEYS

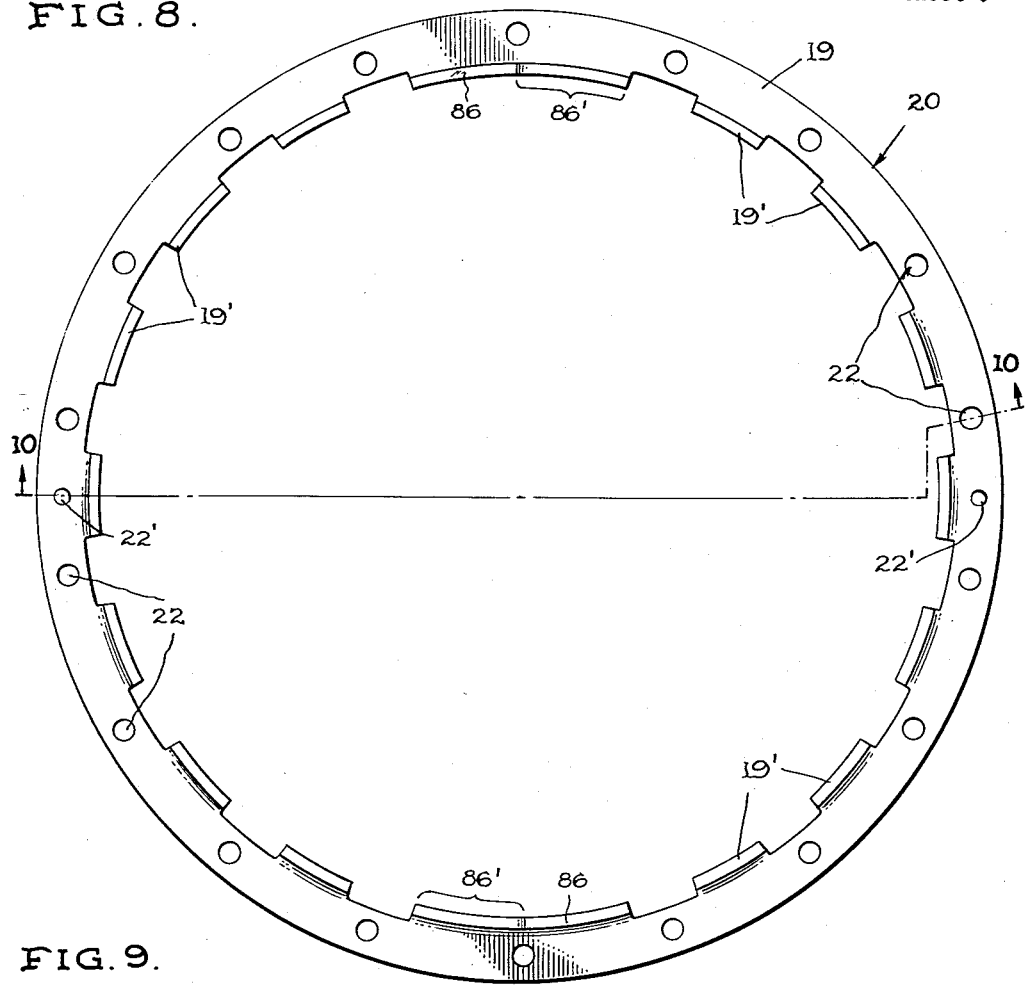
FIG. 8.
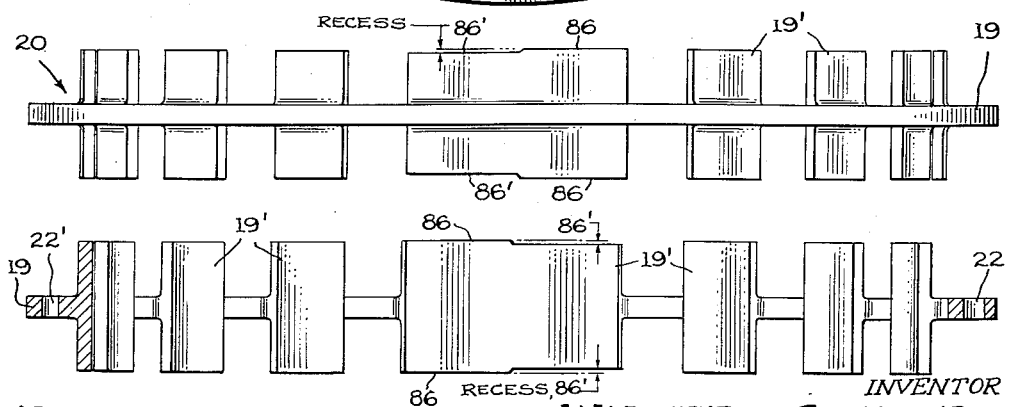
FIG. 9.
FIG. 10
INVENTOR
WALTER GRABER
BY
*Robb & Robb*
ATTORNEYS United States Patent Office 2,971,612
Patented Feb. 14, 1961

2,971,612
LIQUID COOLED DISC BRAKE WITH AUTOMATIC BOOSTER

Walter Graber, St. Joseph, Mich., assignor, by mesne assignments, to Lambert Brake Corporation, St. Joseph, Mich., a corporation of Michigan Filed Aug. 4, 1958, Ser. No. 753,007

26 Claims. (Cl. 188—72)

The present invention relates to friction devices, and more particularly to multiple disc brakes having novel and improved fluid pressure operated actuator means to effect engagement of the brake and having automatic adjuster means operative during reverse direction braking only to effect progressive automatic adjustment of the brake, thus maintaining a uniform "non-over-adjusted" release clearance.

The invention further relates to fluid pressure operated disc brakes, preferably of the servo-actuated type, which are applicable to various kinds of heavy duty service such as is encountered in the operation of heavy industrial machinery, freight and passenger carrying vehicles, and various kinds of earth-working machinery and equipment, including both tractor and/or trailer type vehicles, wherein heavy loads require the use of heavy duty brakes which are capable of withstanding severe service conditions.

A common disadvantage of many present brake constructions of the type employed in the foregoing heavy duty uses is the tremendous amount of heat generated by repeated brake applications and the inability to efficiently and effectively dissipate that high heat content which is retained or trapped within the brake.

Another disadvantage of brakes of this type where automatic adjustment has been commonly employed to function either in a forward direction only or sometimes while the vehicle is moving in a reverse direction as well as when moving in a forward direction, is the tendency toward "over-adjustment." Inasmuch as the more severe braking applications usually occur when the vehicle is moving in a forward direction, and because the brake components have a tendency to deflect to a greater extent during such severe brakings, it has been found that the running clearances between the brake components become excessively reduced and thereby tend to create a drag thereon.

In view of the aforementioned disadvantages, one primary objective of this invention is to provide a multiple disc brake of the servo-actuated type which utilizes improved pressure fluid responsive (preferably hydraulic) operator means including the use of an automatic self-contained pump or booster for complementing normal service brake operation.

Another primary object of this invention is to provide a heavy duty brake of this type having improved operator means including auxiliary means for supplementing brake operation which is automatically operable responsive to normal service braking, and which contemplates the use of cam-operated pump means operable responsive to rotation of the wheel and which is integrally mounted within the brake assembly.

A further primary object is to provide a brake of this class having improved fluid pressure actuator means which employs dual fluid pressure responsive operating means, one of said dual means being constructed and so disposed as to utilize the momentum of the vehicle and the rotation of the wheel or member to be braked to help stop the vehicle, and as a consequence the greater the momentum of the vehicle, the greater the stopping power assistance, available.

Still another object is to provide a heavy duty brake of this type which employs a self-contained hydraulic pump to circulate a liquid coolant (preferably oil) to minimize and effectively dissipate brake heat, as well as to provide an auxiliary or supplementary source of power for effecting improved brake actuation.

A still further object is to provide a brake of this type having improved operator means which utilizes a common self-contained hydraulic pump and selector valve means to circulate the hydraulic coolant, as well as to selectively aid in operating the brake.

Another major objective of this invention is the provision of a brake having improved automatic or self-adjusting means for maintaining a constant release clearance between the brake disc components, by adjusting in one direction only.

Still a further objective of this invention is to provide a brake having self-adjuster means which automatically adjusts the brake responsive to brake application of the vehicle only when going in the reverse direction. By limiting adjustment to the reverse direction brake applications only, automatic adjustment is effected only during the lighter braking applications due to the fact that these applications are usually comparatively much less severe than those incurred in forward braking. Therefore, less opportunity for over-deflection of the brake parts is afforded and excessive reduction of the running clearances and consequent drag is precluded.

Other and further objects and advantages of the invention will become apparent to those skilled in the art from the following detailed description, taken in connection with the accompanying drawings, and the novel features thereof will be defined in the appended claims.

In the drawings:

Fig. 2 is an enlarged cross-sectional view of the brake members and improved actuator means as seen in the upper half of Fig. 1, but showing the brake and auxiliary selector valve in the brake applied position;

Fig. 2A is a slightly enlarged fragmentary detailed view as seen on line 2A—2A of Fig. 2;

Fig. 2B is a perspective view of the rotatable cam member for the hydraulic pump and booster means;

Fig. 3 is a composite sectional and elevational view of the brake as seen from the inboard side of the brake assembly, with the left-hand sector being shown in full elevation, while the sectors or quadrants A—A and B—B are different cross-sectional views as seen substantially on lines A—A and B—B respectively of Fig. 1;

Fig. 3A is a fragmentary cross-sectional view as seen on line 3A—3A of Fig. 3;

Fig. 3B is a fragmentary cross-sectional view as seen on line 3B—3B of Fig. 3, showing a return spring between the primary actuator disc and inboard housing member;

Fig. 8 is a side elevational detail view of the stator disc anchor and carrying member;

Fig. 9 is an edge elevational view of the stator disc anchor shown in Fig. 8;

Fig. 10 is a cross-sectional detail view as taken on line 10—10 of Fig. 8; and

Fig. 11 is a schematic plan view showing one typical coolant circulation system as applicable to a vehicle equipped with brakes according to this invention.

Figure 1:
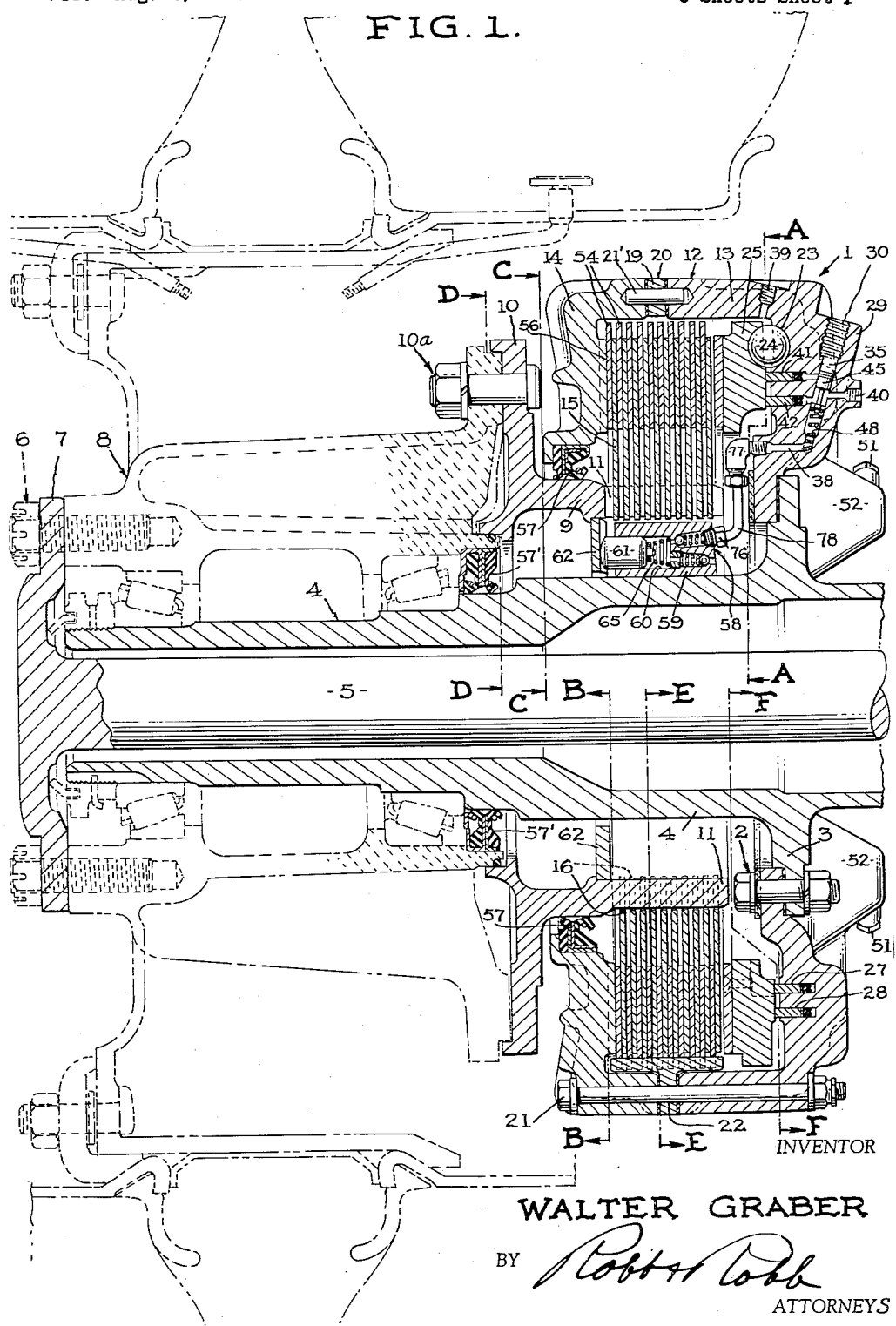
Fig. 1 is a cross-sectional view illustrative of a typical heavy duty, servo-actuated fluid-cooled type of wheel brake in the non-applied position, with certain parts shown in full elevation, as seen substantially on line 1—1 of Fig. 3, and is illustrative of this invention as applied to a typical dual driven rear wheel mounting shown in broken outline.

Like reference characters designate corresponding parts throughout the several figures of the drawings, wherein for the purpose of illustrating one practical embodiment of this invention, a stationary housing assembly of a heavy duty wheel brake generally designated 1 is shown sealingly secured as by gasketed bolt and nut assemblies 2 to a supporting or mounting flange 3 of the fixed axle housing 4 of a rotating, or driving axle 5. The driving axle 5 is shown connected in the usual manner, as by means of stud and nut assemblies 6 passing through the radially extended end flange 7 of the axle 5, to operatively drive a wheel hub assembly 8 (shown in dotted outline) which is rotatably mounted on the axle housing 4 by means of appropriate roller bearing assemblies also shown in dotted line.

A rotor disc driver member 9, having a mounting flange 10 extending radially from its main cylindrical body portion and having a plurality of driving splines 11 at the end of its cylindrical body opposite the mounting flange 10, is connected for rotation with the wheel hub assembly 8 by means of a plurality of bolt and nut assemblies 10a.

The splines 11 of the driver member 9 project into the interior of a two-part stationary housing assembly 12 which comprises inboard and outboard housing members 13 and 14, respectively, to be described in more detail hereinafter, said splines serving to rotatably carry a plurality of rotor friction discs 15 having complementary splined inner peripheries 16, said rotor discs 15 being free to move axially on the splines 11 of driver 9.

The inboard and outboard housing members, 13 and 14, respectively, comprise generally flat annular plate members having the usual outwardly projecting cooling fins, and are further provided with axially extended complementary outer peripheries 17 and 18, respectively, which, when in assembled relationship, oppositely abut against or pinch therebetween a gasketed ring base portion 19 of a splined stator disc carrier or anchor 20, the details of which can better be seen in Figs. 8, 9 and 10. The two-part housing 12 forms a hollow brake shell and is held in assembly by a plurality of bolt and nut assemblies 21 which pass through aligned holes in the respective housing members, as well as through correspondingly aligned holes 22 arranged around the periphery of the stator carrier ring base 19. A pair of dowel pins 21', 21', preferably carried at diametrically opposite positions in the outboard housing member 14 and which mate in holes provided in the inboard housing member 13 as well as passing through holes 22' in stator carrier 20, may further be employed to provide added rigidity and to more easily facilitate alignment of the two housing members.

Inboard housing member 13 serves also as the power plate, and by means of the plurality of bolt and nut assemblies 2 passing through its inner periphery, securely mounts the housing assembly 12 on the supporting flange 3 of the stationary or non-rotating axle housing 4. The inboard housing member 13 is further provided on its inner radially extended face, preferably near the outer periphery thereof, with a plurality of generated circumferentially spaced ramped servo or energizing ball seats 23 which accommodate the hardened steel energizing balls 24. Balls 24 are mutually carried by the inboard housing member 13 and an annular primary actuator disc 25 which is similarly provided on one radially extended face with a plurality of circumferentially spaced generated ramped ball seats 26 which are disposed in opposed relation to the first-mentioned ramped seats 23. A friction face 25' is provided on the side of the actuator disc 25 opposite to the ball seats.

Also provided within the inboard housing member 13 is a pair of preferably identical spaced annular piston cylinders or grooves 27 and 28 which are concentrically disposed about the axis of the brake housing as well as in concentric relation to each other.

An enlarged boss 29, preferably disposed on the upper portion of the outer side of inboard housing member 13, is provided to preferably house or accommodate the following: an inlet port 30 preferably threaded internally to receive a threaded conduit fitting (not shown) to permit the entry of hydraulic operating fluid from a master cylinder (not shown); an air bleed passage 31 preferably spaced parallel with and adjacent to port 30, and threaded internally at its outer end to accommodate a standard screw type bleed valve 32 (Figs. 3 and 3A), and having a connecting passage 33 communicating with annular piston chamber 27; a cylindrical auxiliary selector valve chamber 35 preferably disposed parallel to passage 31 and in communicating alignment with port 30, and also having a pair of connecting passages 36 and 37 communicating with piston chambers 27 and 28, respectively, as well as having a passageway 38 communicating with the interior of the brake housing 12; and a pair of internally threaded oil coolant supply and return passages 39 and 40, respectively, said supply passage 39 connecting directly with the interior of the brake housing 12 and the return passage 40 connecting indirectly therewith via said chamber 35 and said passageway 38.

A pair of preferably identical annular pistons 41 and 42 are slidably disposed for axial movement within the annular piston chambers 27 and 28 aforesaid, piston 41 being more or less the primary piston and operable against the primary actuator disc 25 responsive to fluid pressure from a conventional master cylinder (not shown) and as the result of normal service or foot-pedal brake operation, the pressure fluid entering through passage 30. The other piston 42, which is of equal import but may be termed an auxiliary piston, also operatively acts against the primary actuator disc 25, but is responsive to fluid pressure derived from a dual purpose hydraulic circulating pump to be described hereinafter. Each piston is preferably provided with a back-up ring 43 and a resilient lobed annular seal 44.

A generally cylindrical selector valve 45, having an annularly recessed seal 46 and a depending spring retainer 47 which is provided with openings for passage of hydraulic fluid therepast, is provided within valve chamber 35. A coil expansion spring 48, having one end seating in an extension of reduced diameter below chamber 35 and with the other end seating against the under side of spring retainer seat 47 of valve 45, is disposed to normally hold said selector valve 45 in the non-braking position as shown in Fig. 1.

The primary actuator disc 25 is mounted for both axial and limited rotative movements in spaced relation to inboard housing member 13 by means of the servo balls 24 and a plurality of return springs 49, said springs 49 preferably engaging radially inwardly extending fingers 50 (Figs. 3 and 3B) on actuator disc 25 and shank extensions of bolts 51 threadedly carried in the outer ends of laterally projecting return spring housings 52 on the inboard housing member 13.

Figure 4:
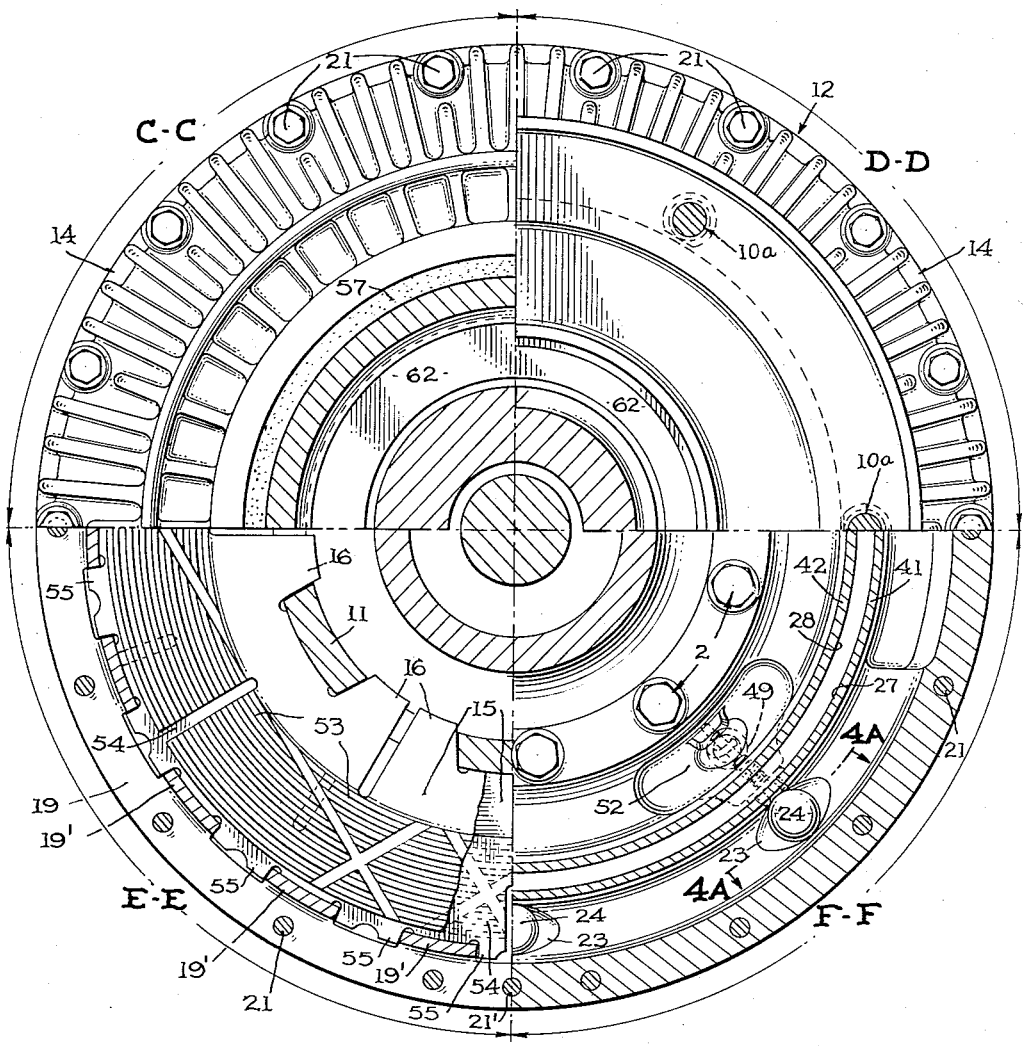
Fig. 4 is also a composite sectional view similar to that shown in Fig. 3, but viewed from the outboard side of the brake, and showing 4 sectors or quadrants indicated at C—C, D—D, E—E and F—F, as viewed substantially on their correspondingly designated section lines of Fig. 1.
Figure 4A:
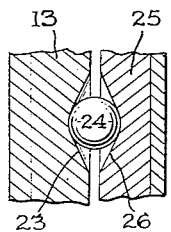
Fig. 4A is a fragmentary cross-sectional view through one of the ramped servo camming ball seats of the primary actuator disc and inboard housing member, respectively, with the ball shown in full elevation, and as seen substantially on line 4A—4A of Figs. 3 and 4.

The rotor friction discs 15, which are rotatably carried on the splined fingers 11 of rotor driver 9, as hereinbefore briefly mentioned, are further preferably provided with bonded sintered metallic linings 53 on opposite faces thereof, which in turn are further provided with the usual annular as well as criss-crossing coolant flow grooves or channels, better seen in quadrant E—E of Fig. 4. A plurality of stator friction discs 54 preferably are alternately interleaved with the stack of rotor discs 15 within the housing 12 and are provided with peripherally disposed splines 55 for anchoring engagement with complementary splines 19' on the stator carrier 20. The stator discs 54 are free to move axially only for interengagement with the rotor discs 15 and with the surface 56 on the interior face of outboard housing member 14.

The inner periphery of the outboard housing member is concentrically spaced radially apart from the cylindrical body portion of the rotor driver 9, and is provided with an oil retaining seal 57 therebetween. A similar oil seal 57' is provided between the wheel hub 8 and axle housing 4. Both seals are preferably press-fitted into place and serve to seal the coolant (such as oil) within the brake assembly.

Considering now the dual functioning (cooling and auxiliary operator) pump means, it is to be understood that in certain adaptations of this invention, a plurality of pump assemblies can be employed in that one or more separate pumps can be employed to accomplish the cooling function; while, by the same token, another plurality of pumps can be employed to accomplish the booster brake operating function instead of using the same pump or pumps. However, in the adaptation illustrated herein, a single pump assembly 58 accomplishing the dual functions is disclosed and will now be described in detail.

A pump cylinder 59 (better seen in Figs. 2 and 3), which constitutes a pump housing and which may be a separate part as shown, or may be integrally formed with the axle housing 4, is secured to said axle housing 4 and is provided therein with a cylindrical piston chamber 60 which is completely open at one end and preferably disposed parallel to the axis of the brake. A spring-loaded piston 61 is provided with one rounded end for smooth and easy riding engagement against the camming face of cam ring 62, said cam 62 being preferably press-fitted within the cylindrical portion of rotor driver 9 as better seen at 63 in Fig. 2. The other end of piston 61 has a flat spring seat with a spring orienting finger 64 projecting therefrom. Preferably, a tapered coil spring 65 is compressed between the seat end of the piston and the inner end of the piston chamber and serves to "spring-load" the piston to continuously urge it into engagement with the camming face of cam ring 62.

Separate inlet and outlet bores or otherwise suitably formed passages, designated 66 and 67, respectively, are provided in the end of the pump cylinder 59 opposite to but communicating with piston chamber 60. Inlet passage 66 is formed with a small outer orifice 68 and preferably a threaded larger inner opening 69. A ball check valve 70 is yieldingly seated against the small orifice 68 by means of a coil spring 71 which is retained within inlet passage 66 by means of a threaded spring retainer 72 which is screwed into the threaded opening 69. The retainer 72 is further provided with preferably a central orifice or passageway 73 which permits free passage of the coolant and operating fluid therethrough during the intake stroke of the piston 61. Outlet passage 67 is preferably of the same form as passage 66, but is merely reversed end-for-end, with ball check valve 74 being yieldingly urged against its seat by spring 75 which is retained therein by a threaded fitting 76. Preferably, a second threaded fitting 77 of elbow form is threadedly attached to the inner end of passageway 38 in inboard housing member 13, and by means of a conduit 78 interconnecting the fittings 76 and 77, the outlet 67 of the pump cylinder 59 is operatively connected to the booster actuating valve chamber 35.

Operation of the cooling and braking aspects of this invention will now be described, with respect to one wheel only, although it is to be understood that all wheels equipped with brakes according to this invention would function together in the same manner. With the vehicle in motion, the rotation of each individual wheel causes a continuous reciprocating motion to be imparted to the pump piston 61 by the rotating cam ring 62. When the brake is in the release, or non-applied position, return springs 49 connecting the primary actuator disc and inboard housing 13 assure free running or release clearance between the various disc members, and the booster or auxiliary selector valve 45 is maintained in the position as shown in Fig. 1 by spring 48 so that coolant return port 40 is in open communication with the lower part of chamber 35 and with the pump outlet 67 via passageway 38 and conduit 78. As the reciprocating piston moves outwardly (in the outboard direction), the coolant which fills the brake housing is drawn in through the small orifice 68 of inlet passage 66, unseating ball check valve 70, and passes through opening 73 of the spring retainer 72 and into the piston chamber 60, the outlet 67 being sealed by ball check valve 74 during this stroke. Now, as the piston 61 moves through its inward stroke, the inlet 66 being sealed by the pressure of both the spring 71 and the fluid against the ball check valve 70, the fluid pressure unseats ball check valve 74 against the spring 75, permitting the fluid to flow through outlet passage 67. Therefore, continuous reciprocation of the pump piston 61 causes fluid to be pumped out through conduit 78, passageway 38, past the selector valve spring seat 47 in chamber 35 and out through the coolant return port 40 where it is circuitously by-passed through a conduit 79, preferably through a heat exchanger 80 and by way of a supply conduit 81 (Fig. 11) back to the brake to enter the housing through coolant fluid entry port 39 (Figs. 1, 2 and 11).

It is to be noted that port 37 which connects the chamber 35 with the auxiliary or "booster" piston 42 in piston chamber 28 is continuously open to the pressure of the fluid being circuitously pumped through chamber 35, regardless of the position of the selector valve 45, but when said valve 45 is in the non-braking position, the fluid pressure exerted against said piston 42 is insufficient to overcome the pressure of the return springs 49 mentioned hereinabove, and therefore the fluid is merely circuitously by-passed on out through port 40. Therefore, it becomes apparent that no drag is imparted to the friction elements as the fluid circulates through and back from the heat exchanger.

When braking is desired, hydraulic fluid from the master cylinder aforementioned, responsive to normal service braking, is forced into the upper part of chamber 35 through port 30 (Fig. 2), the pressure thereof doing two things. First, it exerts an operating pressure against the primary annular piston 41 through backup ring 43 and seal 44 via passage 36, causing primary actuator disc 25 to be moved axially into engagement with the interleaved stack of friction discs. In addition, the hydraulic pressure, resulting from normal service braking, substantially instantaneously causes the selector valve 45 to be depressed inwardly against spring 48 to a position substantially as shown in Fig. 2, whereby the main body of valve 45 blocks off the flow of fluid going out through port 40. Accordingly, the fluid is no longer able to escape through port 40, and with the rotating wheel effecting continuous reciprocation of the pump piston 61, fluid under considerable pressure is forced in through passage 37 to act against the auxiliary operator piston 42 through its backup ring 43 and seal 44, thereby providing an auxiliary source of braking power with consequently greatly improved operation.

As the primary actuator disc 25 moves axially into frictional contact with the stack of interleaved friction discs, drag torque of the nearest adjacent rotor disc 15 is imparted thereto, tending to rotate said actuator disc 25 with the others. As the actuator disc 25 begins to rotate with the friction discs, relative rotation occurs between said actuator disc 25 and the stationary housing 12, whereby the camming or energizing balls 24 attempt to climb up the sides of their complementary ramped seats on the actuator disc 25 and the inboard housing member 13, respectively, thereby camming the actuator disc 25 with considerable additional force, in a well-known servo manner, into tighter frictional engagement against the interleaved stack of friction discs and against the friction surface 56 on outboard housing member 14.

Upon release of the brake pressure, spring 48 permits the selector valve 45 to move radially outward into its normal position, whereby the fluid coolant return port 40 is once again open, and the coolant may again be circuitously pumped out and away from the brake, through the heat exchanger and back again.

Referring now more particularly to the automatic adjustment features and details of this brake as may be seen in Figs. 5–10 inclusively, automatic adjusters for taking up slack between the friction components and to maintain a predetermined release clearance as wear occurs, have been usually employed to operate either in a forward direction only or sometimes while the vehicle is moving in a reverse direction as well as when moving in a forward direction. It has been found that due to more severe braking applications occurring while operating in the forward direction, greater deflection of the brake components occurs; and this, along with the normal adjustment occurring while braking in the reverse direction, tends to excessively reduce the running clearances between the components, thereby creating an undesirable drag thereon.

Therefore, in accordance with one of the primary objectives of this invention, the automatic adjusters disclosed herein are designed to operate only during braking applications while the vehicle is moving in a reverse direction.

Figure 5:
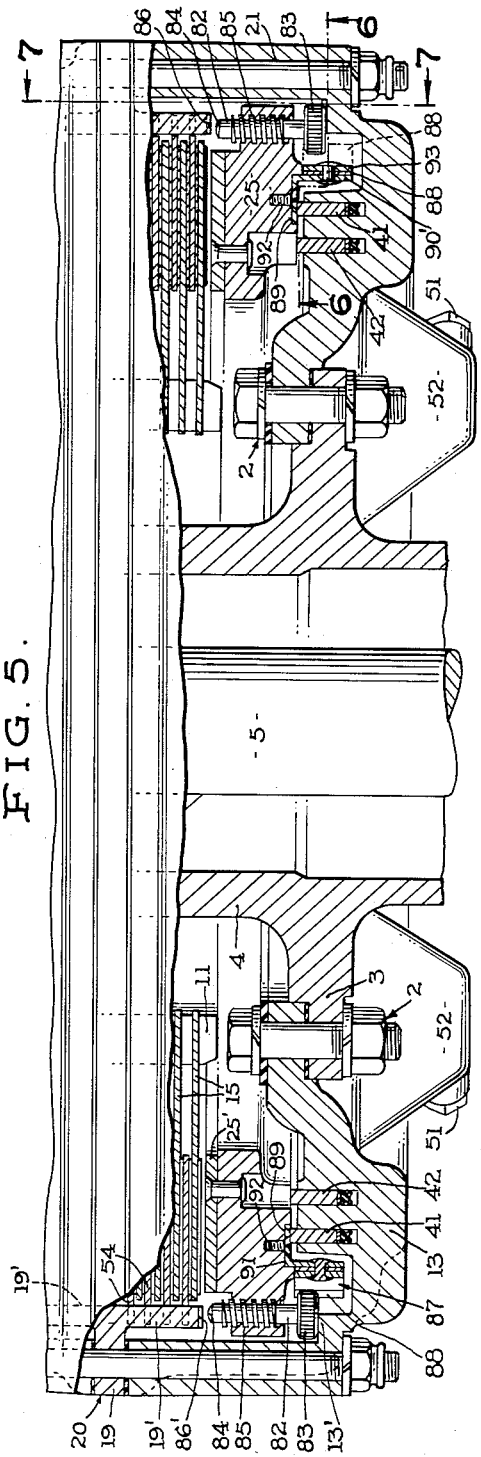
Fig. 5 is an enlarged horizontal cross-sectional view through the inboard side of the brake assembly, more clearly illustrating the self-adjusting means.
Figure 6:
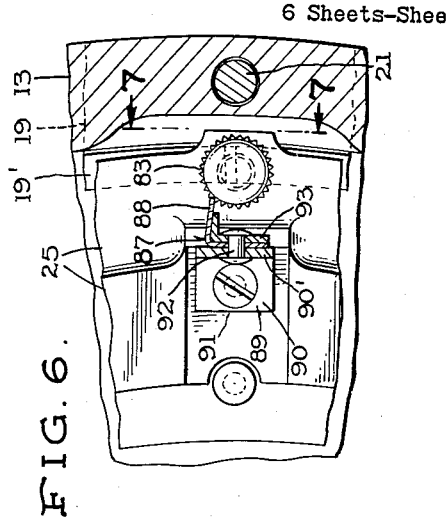
Fig. 6 is an enlarged fragmentary vertical cross-sectional view taken substantially on line 6—6 of Figs. 5 and 7, and more clearly showing the details of the self-adjuster means.
Figure 7:
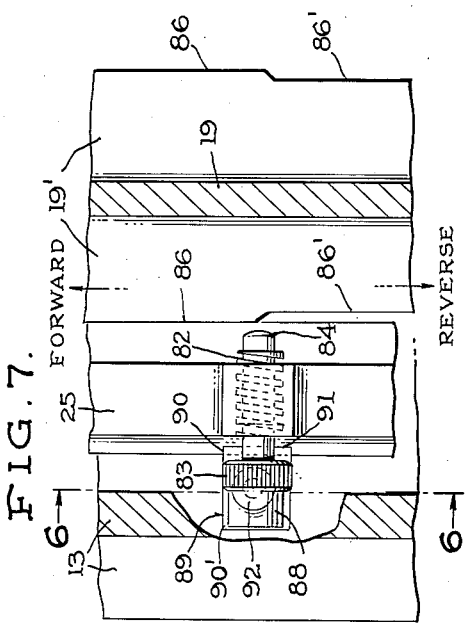
Fig. 7 is an enlarged fragmentary sectional detail of the self-adjuster means as taken substantially on line 7—7 of Figs. 5 and 6.

Referring more particularly to Fig. 5 which is a horizontal cross-section through the adjusting means, a pair of one-way shiftable members 82, 82 are disposed within and preferably carried by diametrically opposite peripheral portions of the primary actuator disc 25. Each member 82 is preferably in the form of a screw threaded member having a head 83 thereon disposed adjacent to a bearing surface 13' on inboard housing plate 13, and also having a rounded lead adjusting end 84 disposed adjacent to the lateral edge of splines 19' of the stator carrier 20. The threads on members 82, 82 are preferably of the buttress type and have a relatively high lead angle so that end thrust on lead ends 84 will impart rotation to the adjuster members 82. Complementary threaded openings 85, 85 are provided in the disc 25 through which the screw members 82, 82 are threadedly mounted, with the lead and head ends thereof projecting in opposite directions from disc 25 toward the stator anchor 19' and housing plate 13, respectively. The overall length of each adjuster screw 82 is slightly less than the distance between the head bearing surface 13' and the lateral edge 86 against which the lead end 84 bears or abuts during brake applications, as will be more fully explained hereinafter, thereby affording an appropriate release clearance for the brake when disengaged.

By referring to the details of the stator carrier 20 as illustrated in Figs. 8–10 inclusively, the unrelieved or non-recessed lateral edges 86, 86 against which the lead ends of the respective adjuster screws bear, can be more readily seen. Adjacent each of these surfaces is a recessed or relieved area 86', which serves to preclude adjusting abutment thereagainst as will be more fully described hereinafter. It is to be further noted that the stator carrier 20 is preferably made symmetrical to facilitate interchangeable and reversible usage.

Means are also provided to positively preclude rotation of the adjuster screws in one direction, this means preferably being in the form of a detent assembly 87 which is disposed so that an angular spring detent 88 engages the serrated teeth on the periphery of each screw head 83. The detent assembly 87 preferably comprises a supporting angle base bracket 89 which is affixed to the actuator disc 25 as by a rivet, a screw, or the like. The bracket 89 is illustrated as being of substantially right-angle form, the base leg 90 being mounted within a complementary shaped recess 91 in the face of actuator disc 25 to prevent rotation of the detent assembly. One leg of angular spring detent 88 is secured to the upstanding portion or leg 90' of bracket 89 as by a rivet or screw 92 passing through leg 90', detent 88 and backup or stiffening member 93. The free leg of detent 88 engages the serrations on the screw head 83.

The illustrated brake is shown in the non-applied position in Fig. 5, and the operation of the brake has been described in the foregoing. As the friction surfaces on the various discs and plates begin to wear progressively, the actuator disc 25 must move progressively farther and farther in an axial direction toward the fixed friction surface 56 on the inner face of outboard housing member 14, in order to effect engagement of the brake. When the actuator disc moves axially into frictional engagement with the interleaved friction disc pack and when the vehicle is traveling in a forward direction, drag torque imparted thereto will impart limited relative rotation to disc 25 in a counterclockwise direction in the case of a left-hand brake, thereby moving therewith the lead ends 84, 84 of the respective adjuster screws into a position opposite the recessed portions 86', 86' of the lateral edges of splines 19' of the stator carrier 20. It therefore becomes apparent that the lead ends 84, 84 of the respective adjuster screws do not make contact with the relieved edges 86', 86' of the stator carrier splines, inasmuch as the friction discs coming into full and complete interengagement preclude automatic adjustment during said forward direction braking application. However, as provided by the construction of this invention, it will be apparent that during braking in the reverse direction, drag torque imparted to the primary actuator disc will permit limited rotation thereof in a clockwise direction, whereby the respective lead ends 84, 84 of the respective adjuster screws will be carried with the actuator disc 25 to a position opposite the respective unrelieved or non-recessed lateral edges 86, 86 of the stator carrier splines, and as the actuator disc 25 continues to move axially to effect complete interengagement of the friction discs, said lead ends 84, 84 will abut or bear against said unrelieved lateral bearing edges 86, 86. Accordingly, endwise pressure is applied to the respective adjuster screws 82, 82 to cause rotation thereof, with attendant axial movement of each screw 82 in a direction so as to cause the headed end of each screw 82 to project farther out from the supporting portion of the actuator disc 25, whereby release movement of the actuator disc 25 will be limited upon abutment of the respective screw heads 83, 83 against their respective bearing surfaces 13' on inboard housing member 13. The spring detent 88 positively precludes rotation of each adjuster screw 82 in a reverse direction so that endwise pressure on the screw heads will not cause axial movement of the screws. In addition, lateral pressure applied to the respective screws 82, 82 by detent 88 precludes any inadvertent or undesired rotation of the screws when the brake is released as might otherwise be caused by vibration, as well as precluding any overrunning of the screws during brake adjustment.

From the foregoing, it will be readily apparent that the objectives and advantages as set out in the preamble hereof are attained by the improved construction of the invention described in the foregoing.

While the specific details of one illustrative form of the invention have been herein shown and described, the invention is not confined or limited thereto as various changes and alterations may be resorted to without departing from the spirit and scope thereof as defined in the appended claims.

I claim:

1. A friction device of the class described, comprising a sealed housing, relatively rotatable interengageable friction members disposed within said housing for interengagement with each other and with said housing, at least one of said friction members having provision for operatively connecting the same to a rotary member and another of said friction members being relatively stationary, dual operator means for effecting interengagement and disengagement of the friction members aforesaid, one of said operator means being responsive to manual operation and the other of said operator means including and being responsive to a reciprocable fluid pump continuously operable responsive to rotation of the rotary member aforesaid, said pump including a fixed pump housing having its longitudinal axis disposed substantially parallel to the axis of the friction device, and said pump being wholly enclosed within said housing.

2. A friction device as defined in claim 1, wherein the last-mentioned operator means also constitutes a coolant circulating means for the device.

3. A friction device as defined in claim 1, wherein the last-mentioned operator means also includes means for circulating a coolant medium through the device when the friction members are disengaged.

4. A friction device of the class described, comprising relatively rotatable interengageable friction members, at least one of said friction members having provision for operatively connecting the same to a rotary member and another of said friction members being relatively stationary, dual operator means for effecting interengagement and disengagement of the friction members aforesaid, one of said operator means being responsive to manual operation, the other of said operator means including and being responsive to a reciprocable fluid pump continuously operable responsive to rotation of the rotary member aforesaid, said last-mentioned operator means also including means for selectively circulating a coolant medium through the device when the friction members are disengaged and for exerting fluid pressure on one of the friction members during interengagement of the friction members.

5. A friction device as defined in claim 1, wherein the fluid pump comprises a relatively stationary pump cylinder having a piston chamber therein, a piston reciprocably disposed in said piston chamber, and rotary means operable responsive to the rotary member aforesaid for imparting reciprocating movement to said piston.

6. A friction device as defined in claim 1, wherein the dual operator means includes selector means for directing pressure fluid to effect frictional interengagement and disengagement aforesaid, and wherein the fluid pump comprises a relatively stationary pump cylinder having a piston chamber therein, said pump cylinder also having a fluid inlet and outlet respectively connecting the piston chamber with a source of pressure fluid and with the selector means aforesaid, said inlet and outlet having check valve means therein, a piston reciprocably disposed in said piston chamber, and rotary means operable responsive to the rotary member aforesaid for imparting reciprocating movement to said piston.

7. A friction device as defined in claim 1, wherein the dual operator includes cooperative selector means for selectively directing pressure fluid to effect frictional interengagement of the friction members responsive to one or both of said operator means, respectively.

8. A friction device as defined in claim 1, wherein the dual operator means includes selector means cooperative with said pump for selectively directing operating pressure fluid to effect frictional interengagement as aforesaid.

9. A friction device as defined in claim 1, wherein the dual operator means comprises at least one annular operator piston slidably disposed within a complementary piston chamber integrally formed within said housing, said piston being disposed adjacent to and operable against one of the friction members.

10. A friction device as defined in claim 1, wherein the dual operator means comprises at least one annular operator piston slidably disposed within a complementary piston chamber integrally formed within said housing, said piston being disposed adjacent to and operable against one of the friction members, and selector means cooperative with said fluid pump, said selector means and pump being cooperatively disposed wholly within the sealed housing to selectively establish and direct operating pressure fluid against the operator piston aforesaid.

11. A friction device of the class described, comprising a sealed housing, relatively rotatable interengageable friction members disposed within said housing for interengagement with each other and with said housing, at least one of said friction members having provision for operatively connecting the same to a rotary member and another of said friction members being relatively stationary, dual operator means for effecting interengagement and disengagement of the friction members aforesaid, one of said operator means being responsive to manual operation and the other of said operator means including and being responsive to a reciprocable fluid pump continuously operable responsive to rotation of the rotary member aforesaid, said dual operator means comprising a plurality of operator pistons slidably disposed within complementary piston chambers formed within said housing, said pistons being disposed adjacent to and operable against one of the friction members, selector means cooperative with the dual operator means to selectively direct operating pressure fluid against the respective pistons aforesaid, said selector means comprising a selector valve slidably disposed within a valve chamber formed within said housing adjacent to and operatively communicable with said pistons, and a spring within said chamber for normally holding the selector valve in a position that precludes application of operating pressure fluid to at least one of the operator pistons while simultaneously causing the fluid to by-pass around that operator means which is responsive to pressure fluid derived from said pump when the device is in a non-applied condition.

12. A friction device as defined in claim 11, further comprising a fluid-cooling means disposed externally of but operatively connected to said housing, said selector valve chamber also having operative connection with the fluid pump and with said cooling means, said selector valve blocking off said cooling means responsive to manual operation of the manually operable operator means and simultaneously directing operating fluid pressure from said fluid pump against the other operator piston.

13. A friction device of the class described, comprising a sealed housing, a pair of relatively movable friction members disposed within said housing for frictional engagement with each other and with said housing, dual fluid pressure operator means for effecting the frictional interengagement aforesaid, one of said dual operator means being responsive to a source of pressure fluid externally of the housing and the other of said dual operator means being responsive to a source of pressure fluid internally of said housing, and means for releasing the frictional interengagement aforesaid when the operator means are in a non-applied condition.

14. A friction device as defined in claim 13, wherein the last-mentioned operator means also constitutes a coolant circulating means for the device.

15. A friction device as defined in claim 13, wherein said other operating means includes coolant fluid circulating pump means, said pump means comprising a relatively stationary pump cylinder having a piston chamber therein, a piston reciprocably disposed in said piston chamber, and rotary cam means for imparting reciprocating movement to said piston.

16. A friction device as defined in claim 13, wherein said other operator means includes fluid pump means for establishing an operating fluid pressure for effecting said frictional interengagement of the friction members aforesaid.

17. A friction device as defined in claim 13, wherein said other operator means includes fluid pump means, said pump means comprising a relatively stationary pump cylinder having a piston chamber therein, a piston reciprocably disposed in said piston chamber, and rotary means for imparting reciprocating movement to said piston.

18. A friction device as defined in claim 13, wherein the dual operator means includes fluid pump means, and selector means cooperative with said pump means for establishing and directing operating pressure fluid to effect frictional interengagement as aforesaid.

19. A friction device as defined in claim 13, wherein the dual operator means comprises a plurality of annular operator pistons slidably disposed within complementary piston chambers formed integrally within said housing, and said pistons being disposed adjacent to and operable against the friction members.

20. A friction device as defined in claim 13, wherein the dual operator means comprises a plurality of annular operator pistons slidably disposed within piston chambers integrally formed within said housing, said pistons being disposed adjacent to and operable against the friction members, selector means operatively connected with each operator means, one of said operator means comprising self-contained fluid pump means disposed radially inward of said friction members, said pump means and selector means being cooperatively disposed wholly within said housing to establish and direct operating pressure fluid against the pistons aforesaid.

21. A friction device as defined in claim 13, wherein the dual operator means comprises a plurality of operator pistons slidably disposed within piston chambers formed within said housing, said pistons being adjacent to and operable against the friction members, selector means cooperative with the operator means for directing operating pressure fluid against the pistons aforesaid, said selector means comprising a selector valve slidably disposed within a chamber formed within said housing adjacent to and operatively communicable with said pistons, said valve chamber being operatively connected with each of the pressure fluid sources, and a spring in said chamber for normally holding the selector valve in a position which precludes the application to the pistons of operating pressure fluid from either source and simultaneously causing the fluid to by-pass around that operator piston which is responsive to pressure fluid derived from the latter of the operator means when the device is in a nonapplied condition.

22. A friction device as defined in claim 21, further including fluid cooling means disposed externally of but connecting with said housing, said selector valve chamber also having operative connection with the internal source of pressure fluid and with said externally disposed cooling means, thereby providing a fluid by-pass around that operator piston which is responsive to the internal source of pressure fluid, said selector valve blocking off said valve chamber from said cooling means responsive to operating pressure fluid from the external source and thereby simultaneously directing operating pressure fluid from both sources against the operator pistons aforesaid.

23. A friction device of the class described, comprising relatively rotatable interengageable friction members, at least one of said friction members having provision for operatively connecting the same to a rotary member and another of said friction members being relatively stationary, operator means for effecting interengagement and disengagement of the friction members aforesaid, and a reciprocable fluid coolant circulating pump disposed wholly within the friction device and radially inwardly of the friction members, said pump having its longitudinal axis disposed substantially parallel to the axis of the friction device and being continuously operable responsive to rotation of the rotary member for circulating a coolant medium through said friction device.

24. A friction device of the class described, comprising relatively rotatable interengageable friction members, at least one of said friction members having provision for operatively connecting the same to a rotary member and another of said friction members being relatively stationary, operator means for effecting interengagement and disengagement of the friction members aforesaid, a self-contained reciprocable fluid coolant circulating pump disposed radially inwardly of the friction members and being continuously operable responsive to rotation of the rotary member for circulating a coolant medium through said friction device, and said operator means and circulating pump having a common source of operating fluid within the friction device and in which the friction members are at least partially submerged.

25. A friction device of the class described, comprising relatively rotatable interengageable friction members, at least one of said friction members having provision for operatively connecting the same to a rotary member and another of said friction members being relatively stationary, operator means for effecting interengagement and disengagement of the friction members aforesaid, and a reciprocable fluid coolant circulating pump continuously operable responsive to rotation of the rotary member for circulating a coolant medium through said friction device, said pump also constituting auxiliary means for effecting engagement and disengagement of the friction members.

26. A friction device of the class described, comprising a pressure fluid sealed housing, friction means shiftably disposed within said housing for interengagement therewith, movable actuator means for shifting said friction means as aforesaid, dual fluid pressure operator means for moving the actuator means as aforesaid, one of said dual operator means being responsive to a source of pressure fluid externally of the friction device and the other of said dual operator means being responsive to a source of pressure fluid within said housing, and means for establishing a running clearance of the friction members when in a non-engaged position.

References Cited in the file of this patent

UNITED STATES PATENTS

| | | |
|---|---|---|
| 2,206,976 | Rossmann | July 9, 1940 |
| 2,402,115 | Levy | June 11, 1946 |
| 2,569,670 | Hollerith | Oct. 2, 1951 |
| 2,732,042 | Lucker | Jan. 24, 1956 |
| 2,733,781 | Brisson | Feb. 7, 1956 |
| 2,816,630 | Kelley et al. | Dec. 17, 1957 |
| 2,887,961 | Hawley | May 26, 1959 |

FOREIGN PATENTS

| | | |
|---|---|---|
| 450,762 | Italy | Aug. 9, 1949 |